US012812454B2

(12) United States Patent
Majumdar et al.

(10) Patent No.: US 12,812,454 B2
(45) Date of Patent: Nov. 24, 2026

(54) COMMON FREQUENCY RESOURCE SHARING DETERMING FOR MULTICAST/BROADCAST SERVICE BASED ON QUALITY OF SERVICE INFORMATION

(71) Applicant: Nokia Technologies Oy, Espoo (FI)

(72) Inventors: Chitradeep Majumdar, Bangalore (IN); Ugur Baran Elmali, Munich (DE); Bighnaraj Panigrahi, Bangalore (IN); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 187 days.

(21) Appl. No.: 18/798,822

(22) Filed: Aug. 9, 2024

(65) Prior Publication Data

US 2025/0056307 A1 Feb. 13, 2025

(30) Foreign Application Priority Data

Aug. 11, 2023 (IN) ............................ 202341053890

(51) Int. Cl.
*H04W 28/02* (2009.01)
*H04L 47/70* (2022.01)
(Continued)

(52) U.S. Cl.
CPC ......... *H04W 28/0268* (2013.01); *H04W 8/22* (2013.01); *H04W 76/40* (2018.02)

(58) Field of Classification Search
CPC ... H04W 28/0268; H04W 8/22; H04W 76/40; H04W 76/12; H04W 4/06; H04W 72/566; H04L 47/825
See application file for complete search history.

(56) References Cited

U.S. PATENT DOCUMENTS

2023/0217298 A1* 7/2023 Chae ....................... H04L 45/16 370/328
2024/0073796 A1* 2/2024 Azizi .................... H04W 48/16
(Continued)

*Primary Examiner* — Harry H Kim
(74) *Attorney, Agent, or Firm* — Barta Jones, PLLC

(57) ABSTRACT

An apparatus is provided, comprising at least one processor, and at least one memory including computer program code, wherein the at one memory and the computer program code are configured, with the at least one processor, to cause the apparatus to receive a first QoS information for a limited capability UE and a second QoS information for a non-limited capability UE, wherein the first and second QoS information relate to a MBS broadcast or multicast session available on both the limited capability UE and the non-limited capability UE, determine, based on the received first and second QoS information, whether a common frequency resource associated with the limited capability UE can be used for receiving the MBS broadcast or multicast session by both the limited capability UE and the non-limited capability UE, provide a first tunnel for the transmission of the MBS broadcast or multicast session to the limited capability UE and provide a second tunnel for transmission of the MBS broadcast or multicast session to the non-limited capability UE if it is determined that the common frequency resource associated with the limited capability UE cannot be used for receiving the MBS broadcast or multicast session by both the limited capability UE and the non-limited capability UE, and provide the first tunnel for the transmission of the MBS broadcast or multicast session to the limited capability UE and for the transmission of the MBS broadcast or multicast session to the non-limited capability UE if it is determined that the common frequency resource associated with the limited capability UE can be used for receiving the MBS broadcast or multicast session by both the limited capability UE and the non-limited capability UE.

20 Claims, 11 Drawing Sheets

(51) Int. Cl.

| | |
|---|---|
| ***H04W 4/06*** | (2009.01) |
| ***H04W 8/22*** | (2009.01) |
| ***H04W 72/566*** | (2023.01) |
| ***H04W 76/12*** | (2018.01) |
| ***H04W 76/40*** | (2018.01) |

(56) References Cited

U.S. PATENT DOCUMENTS

| | | | | |
|---|---|---|---|---|
| 2025/0039905 | A1* | 1/2025 | Huang | H04L 5/0094 |
| 2025/0063579 | A1* | 2/2025 | Mu | H04W 72/0453 |
| 2025/0176003 | A1* | 5/2025 | Liu | H04W 72/51 |
| 2026/0032706 | A1* | 1/2026 | Sha | H04W 36/0055 |

* cited by examiner

COMMON FREQUENCY RESOURCE SHARING DETERMING FOR MULTICAST/BROADCAST SERVICE BASED ON QUALITY OF SERVICE INFORMATION

FIELD OF THE DISCLOSURE

The invention generally relates to an apparatus, methods and computer program products, in particular, but not exclusively, for network apparatuses (gNBs) and user equipments (UEs) as parts of communications systems.

BACKGROUND

A communication system enables communication between two or more entities such as communication devices, base stations and/or other nodes by providing carriers between the various entities involved in the communications path.

The communication system may be a wireless communication system. Examples of wireless communication systems include public land mobile networks (PLMN) operating based on radio standards, for example radio standards provided by 3GPP, satellite-based communication systems and different wireless local networks, for example wireless local area networks (WLAN). The wireless systems can be divided into cells and are often referred to as cellular systems or cellular networks.

The communication system and associated devices typically operate in accordance with a given standard or specification, which sets out how the various entities associated with system are permitted to perform, how they are allowed to interact with each other and how that should be achieved. Communication protocols and/or parameters that shall be used for the connection(s) within the network are also defined by the standard or specification. As mentioned above, some examples of standards are the radio standards provided by 3GPP, for example 2G, 3G, 4G and 5G. The communication system described herein is based on the 5G standard. However, the described embodiments are not limited to operating according to 5G and may also be applicable to future radio standards, for example 6G.

SUMMARY

According to an aspect of the invention, there is provided an apparatus. The apparatus comprises at least one processor, and at least one memory including computer program code. The at least one memory and the computer program code are configured, with the at least one processor, to cause the apparatus to receive a first QoS information for a limited capability UE and a second QoS information for a non-limited capability UE, wherein the first and second QoS information relate to a MBS broadcast or multicast session available on both the limited capability UE and the non-limited capability UE, determine, based on the received first and second QoS information, whether a common frequency resource associated with the limited capability UE can be used for receiving the MBS broadcast or multicast session by both the limited capability UE and the non-limited capability UE, provide a first tunnel for the transmission of the MBS broadcast or multicast session to the limited capability UE and provide a second tunnel for transmission of the MBS broadcast or multicast session to the non-limited capability UE if it is determined that the common frequency resource associated with the limited capability UE cannot be used for receiving the MBS broadcast or multicast session by both the limited capability UE and the non-limited capability UE, and provide the first tunnel for the transmission of the MBS broadcast or multicast session to the limited capability UE and for the transmission of the MBS broadcast or multicast session to the non-limited capability UE if it is determined that the common frequency resource associated with the limited capability UE can be used for receiving the MBS broadcast or multicast session by both the limited capability UE and the non-limited capability UE.

The apparatus can be further configured to receive at least one of a second information together with the first QoS information indicating that the first QoS information is for a limited capability UE, and a third information, together with the second QoS information indicating that the second QoS Information is for a non-limited capability UE, wherein the determining is based further on the second and third information.

Another aspect provides an apparatus, comprising at least one processor, and at least one memory including computer program code, wherein the at least one memory and the computer program code are configured, with the at least one processor, to cause the apparatus to: receive, from a 5G Core Network, a first QoS information for a limited capability UE and a second QoS information for a non-limited capability UE, wherein the first and second Qos information relate to an MBS broadcast or multicast session available for both the limited capability UE and the non-limited capability UE, determine, based on the received first and second QoS information, whether a common frequency resource associated with the limited capability UE can be used for receiving the MBS broadcast or multicast session by both the limited capability UE and the non-limited capability UE, and provide back to 5GC at least one of: a single tunnel transport layer address (TNLA) for the transmission of the MBS broadcast or multicast session to both the limited capability UE and non-limited capability UE if it is determined that the common frequency resource associated with the limited capability UE can be used for receiving the MBS broadcast or multicast session by both the limited capability UE and the non-limited capability UE, separate tunnel TNLAs if it is determined that the common frequency resource associated with the limited capability UE cannot be used for receiving the MBS broadcast or multicast session by both the limited capability UE and the non-limited capability UE, an indicator indicating that the common frequency resource associated with the limited capability UE can be used for receiving the MBS broadcast or multicast session by both the limited capability UE and the non-limited capability UE if it is determined that the common frequency resource associated with the limited capability UE can be used for receiving the MBS broadcast or multicast session by both the limited capability UE and the non-limited capability UE, an indicator indicating that the common frequency resource associated with the limited capability UE cannot be used for receiving the MBS broadcast or multicast session by both the limited capability UE and the non-limited capability UE if it is determined that the common frequency resource associated with the limited capability UE cannot be used for receiving the MBS broadcast or multicast session by both the limited capability UE and the non-limited capability UE.

The first QoS information and the second QoS information can be received from the 5G core network, 5GC, associated with the same broadcast or multicast session identifier or TMGI (temporary mobile group identifier)

The first and second QoS information can be received from the 5GC in an NG application protocol broadcast or multicast setup request or modification request message.

The first QoS information can be received from the 5GC associated with a first broadcast or multicast session identifier or TMGI 1 and the second QoS information can be received from the 5GC associated with a second broadcast or multicast session identifier or TMGI 2.

The first QoS information can be received in a first NG application protocol broadcast or multicast setup or modification request message including the first broadcast or multicast session identifier TMGI 1 and the second QoS information can be received in a second NG application protocol broadcast or multicast setup or modification request message including the second broadcast or multicast session identifier TMGI 2.

The apparatus can be comprised within a radio access node, for example a gNB.

In particular, the apparatus can be comprised in a central unit control plane (CU CP) entity of a radio access node.

Determining (whether the common frequency resource for the limited capability UE can be used for receiving the MBS broadcast or multicast session by both the limited capability UE and the non-limited capability UE) may comprise sending to a distributed unit (DU) of the radio access node a first QoS information for a limited capability UE and a second QoS information for a non-limited capability UE, wherein the first and second QoS information relate to an MBS broadcast or multicast session available for both the limited capability UE and the non-limited capability UE, and receiving from the DU at least one of: a single DU tunnel TNLA when it is determined that the common frequency resource associated with the limited capability UE can be used for receiving the MBS broadcast or multicast session by both the limited capability UE and the non-limited capability UE, a separate DU tunnel TNLA it is determined that the common frequency resource associated with the limited capability UE cannot be used for receiving the MBS broadcast or multicast session by both the limited capability UE and the non-limited capability UE, an indicator indicating that the common frequency resource associated with the limited capability UE can be used for receiving the MBS broadcast or multicast session by both the limited capability UE and the non-limited capability UE if it is determined that the common frequency resource associated with the limited capability UE can be used for receiving the MBS broadcast or multicast session by both the limited capability UE and the non-limited capability UE, and/or an indicator indicating that the common frequency resource associated with the limited capability UE cannot be used for receiving the MBS broadcast or multicast session by both the limited capability UE and the non-limited capability UE if it is determined that the common frequency resource associated with the limited capability UE cannot be used for receiving the MBS broadcast or multicast session by both the limited capability UE and the non-limited capability UE.

In a further aspect, there is provided an apparatus, comprising at least one processor, and at least one memory including computer program code, wherein the at least one memory and the computer program code are configured, with the at least one processor, to cause the apparatus to receive, at the distributed unit, DU, of a radio access node, from a central unit control plane, CU CP, of the radio access node, a first QoS information for a limited capability UE and a second QoS information for a non-limited capability UE, wherein the first and second QoS information relate to an MBS broadcast or multicast session available for both the limited capability UE and the non-limited capability UE, determine, at the DU, based on the received first and second QoS information, whether a common frequency resource associated with the limited capability UE can be used for receiving the MBS broadcast or multicast session by both the limited capability UE and the non-limited capability UE; and provide back to the CU CP at least one of a single tunnel transport layer address (TNLA) for the transmission of the MBS broadcast or multicast session to both the limited capability UE and non-limited capability UE if it is determined that the common frequency resource associated with the limited capability UE can be used for receiving the MBS broadcast or multicast session by both the limited capability UE and the non-limited capability UE, separate tunnel TNLAs if it is determined that the common frequency resource associated with the limited capability UE cannot be used for receiving the MBS broadcast or multicast session by both the limited capability UE and the non-limited capability UE, an indicator indicating that the common frequency resource associated with the limited capability UE can be used for receiving the MBS broadcast or multicast session by both the limited capability UE and the non-limited capability UE if it is determined that the common frequency resource associated with the limited capability UE can be used for receiving the MBS broadcast or multicast session by both the limited capability UE and the non-limited capability UE, and/or an indicator indicating that the common frequency resource associated with the limited capability UE cannot be used for receiving the MBS broadcast or multicast session by both the limited capability UE and the non-limited capability UE if it is determined that the common frequency resource associated with the limited capability UE cannot be used for receiving the MBS broadcast or multicast session by both the limited capability UE and the non-limited capability UE.

The first QoS information and the second QoS information can be received from the CU CP associated with the same broadcast or multicast session identifier or TMGI.

The first and second QoS information can be received from the CU CP in an F1 application protocol broadcast or multicast setup request or modification request message. The first QoS information can be received from the CU CP associated with a first broadcast or multicast session identifier or TMGI 1 and the second QoS information can be received from the 5GC associated with a second broadcast or multicast session identifier or TMGI 2.

The first QoS information can be received in a first F1 application protocol broadcast or multicast setup or modification request message including the first broadcast or multicast session identifier TMGI 1 and the second Qos information can be received in a second F1 application protocol broadcast or multicast setup or modification request message including the second broadcast or multicast session identifier TMGI 2.

In another aspect there is provided means for receiving a first QoS information for a limited capability UE and a second QoS information for a non-limited capability UE, wherein the first and second QoS information relate to a MBS broadcast or multicast session available on both the limited capability UE and the non-limited capability UE, means for determining, based on the received first and second QoS information, whether a common frequency resource associated with the limited capability UE can be used for receiving the MBS broadcast or multicast session by both the limited capability UE and the non-limited capability UE, means for providing a first tunnel for the transmission of the MBS broadcast or multicast session to the limited capability UE and provide a second tunnel for transmission of the MBS broadcast or multicast session to the non-limited capability UE if it is determined that the common frequency resource associated with the limited capability UE cannot be used for receiving the MBS broadcast or multicast session by both the limited capability UE and the non-limited capability UE, and means for providing the first tunnel for the transmission of the MBS broadcast or multicast session to the limited capability UE and for the transmission of the MBS broadcast or multicast session to the non-limited capability UE if it is determined that the common frequency resource associated with the limited capability UE can be used for receiving the MBS broadcast or multicast session by both the limited capability UE and the non-limited capability UE.

The apparatus can be a radio access node, such as a gNB, or a component thereof, such as a distributed unit (DU).

Another aspect provides a method. The method comprises receiving a first QoS information for a limited capability UE and a second QoS information for a non-limited capability UE, wherein the first and second QoS information relate to a MBS broadcast or multicast session available on both the limited capability UE and the non-limited capability UE, determining, based on the received first and second QoS information, whether a common frequency resource associated with the limited capability UE can be used for receiving the MBS broadcast or multicast session by both the limited capability UE and the non-limited capability UE, providing a first tunnel for the transmission of the MBS broadcast or multicast session to the limited capability UE and provide a second tunnel for transmission of the MBS broadcast or multicast session to the non-limited capability UE if it is determined that the common frequency resource associated with the limited capability UE cannot be used for receiving the MBS broadcast or multicast session by both the limited capability UE and the non-limited capability UE, and providing the first tunnel for the transmission of the MBS broadcast or multicast session to the limited capability UE and for the transmission of the MBS broadcast or multicast session to the non-limited capability UE if it is determined that the common frequency resource associated with the limited capability UE can be used for receiving the MBS broadcast or multicast session by both the limited capability UE and the non-limited capability UE.

A further aspect provides a method. The method comprises receiving, from a 5G Core, a first QoS information for a limited capability UE and a second QoS information for a non-limited capability UE, wherein the first and second QoS information relate to an MBS broadcast or multicast session available for both the limited capability UE and the non-limited capability UE, determining, based on the received first and second QoS information, whether a common frequency resource associated with the limited capability UE can be used for receiving the MBS broadcast or multicast session by both the limited capability UE and the non-limited capability UE, and providing back to 5GC at least one of: a single tunnel transport layer address (TNLA) for the transmission of the MBS broadcast or multicast session to both the limited capability UE and non-limited capability UE if it is determined that the common frequency resource associated with the limited capability UE can be used for receiving the MBS broadcast or multicast session by both the limited capability UE and the non-limited capability UE, separate tunnel TNLAs if it is determined that the common frequency resource associated with the limited capability UE cannot be used for receiving the MBS broadcast or multicast session by both the limited capability UE and the non-limited capability UE, an indicator indicating that the common frequency resource associated with the limited capability UE can be used for receiving the MBS broadcast or multicast session by both the limited capability UE and the non-limited capability UE if it is determined that the common frequency resource associated with the limited capability UE can be used for receiving the MBS broadcast or multicast session by both the limited capability UE and the non-limited capability UE, an indicator indicating that the common frequency resource associated with the limited capability UE cannot be used for receiving the MBS broadcast or multicast session by both the limited capability UE and the non-limited capability UE if it is determined that the common frequency resource associated with the limited capability UE cannot be used for receiving the MBS broadcast or multicast session by both the limited capability UE and the non-limited capability UE.

In another aspect there is provided a method. The method comprises receiving, at the distributed unit, DU, of a radio access node, from a central unit control plane, CU CP, of the radio access node, a first QoS information for a limited capability UE and a second QoS information for a non-limited capability UE, wherein the first and second QoS information relate to an MBS broadcast or multicast session available for both the limited capability UE and the non-limited capability UE, determining, at the DU, based on the received first and second QoS information, whether a common frequency resource associated with the limited capability UE can be used for receiving the MBS broadcast or multicast session by both the limited capability UE and the non-limited capability UE; and providing back to the CU CP at least one of a single tunnel transport layer address (TNLA) for the transmission of the MBS broadcast or multicast session to both the limited capability UE and non-limited capability UE if it is determined that the common frequency resource associated with the limited capability UE can be used for receiving the MBS broadcast or multicast session by both the limited capability UE and the non-limited capability UE, separate tunnel TNLAs if it is determined that the common frequency resource associated with the limited capability UE cannot be used for receiving the MBS broadcast or multicast session by both the limited capability UE and the non-limited capability UE, an indicator indicating that the common frequency resource associated with the limited capability UE can be used for receiving the MBS broadcast or multicast session by both the limited capability UE and the non-limited capability UE if it is determined that the common frequency resource associated with the limited capability UE can be used for receiving the MBS broadcast or multicast session by both the limited capability UE and the non-limited capability UE, an indicator indicating that the common frequency resource associated with the limited capability UE cannot be used for receiving the MBS broadcast or multicast session by both the limited capability UE and the non-limited capability UE if it is determined that the common frequency resource associated with the limited capability UE cannot be used for receiving the MBS broadcast or multicast session by both the limited capability UE and the non-limited capability UE.

Another aspect provides a computer program product embodied on a distribution medium readable by a computer and comprising program instructions which, when the program is executed by an apparatus, cause the apparatus to carry out the method illustrated in FIGS. 9 to 11.

A further aspect provides a computer program product comprising program instructions which, when the program is executed by an apparatus, cause the apparatus to carry out the method illustrated in FIGS. 9 to 11.

In this way, the radio access node can efficiently and dynamically decide which common frequency resources are required for a broadcast or multicast session, based changing cell conditions and on QoS requirements of the session. The broadcast or multicast session does not need to always be transmitted over the air twice.

DETAILED DESCRIPTION

Figure 1:
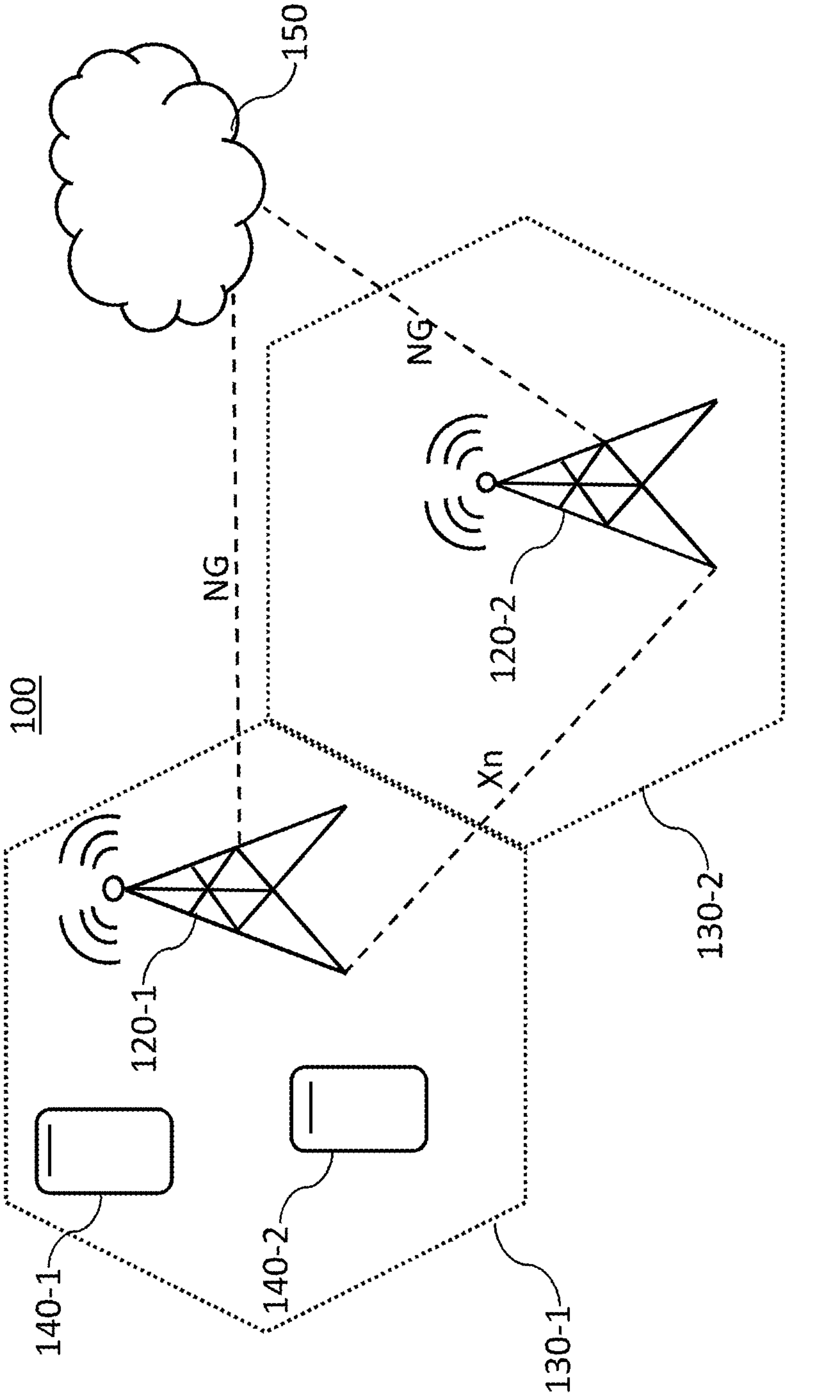
FIG. 1 shows a simplified schematic illustration of a 5G network.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "at least one of A or B", "at least one of A and B", "A and/or B" means (A), (B), or (A and B). For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments.

3GPP Rel-17 MBS WI specifies broadcast or multicast reception for user equipment (UE) that can be in IDLE/INACTIVE/CONNECTED RRC states (e.g. RRC_IDLE, RRC_INACTIVE, RRC_CONNECTED).

It should be noted that, for brevity, broadcast or multicast session or service will often be referred to as a broadcast session or session. However, the embodiments described can apply to both broadcast and multicast sessions or services.

System Information Block 20 (SIB20) is a message that contains information for the UE to receive the Multicast Control Channel (MCCH) data, including the repetition period and configured transmission/reception window of MCCH. The MCCH data includes control information necessary for the UE to understand the broadcast or multicast sessions/services provided in the cell and scheduling information to receive the broadcasted data. This information is transmitted periodically by a gNB (gNodeB) with a configurable repetition period and within a configured transmission window.

The MCCH provides essential information about the Multicast Traffic Channels (MTCHs), which are the data channels where the broadcast services are provided. This information includes search spaces, Discontinuous Reception (DRX) information, etc. The UE uses this information to receive the relevant MTCH(s). Each Temporary Mobile Group Identity (TMGI), which is an identifier of a specific broadcast service, is mapped to a specific MTCH.

To receive the MCCH data, the UE reads and decodes the SIB20 message to learn the MCCH configuration/scheduling details. Then the UE reads the MCCH data to learn about the services provided in the cell and their scheduling information. However, for the UEs in RRC_CONNECTED state, the SIB reading is ignored, and the UE is provided with the search space configuration to receive MCCH within PDCCH-ConfigCommon. While in RRC_INACTIVE state, the UE retrieves information from the SIB20 block such as the MCCH repetition scheduling configuration, window duration, and start slot. The MCCH contents and the repetition window of the MCCH do not change within the modification period.

Rel-17 specifications describe the RRC_INACTIVE/RRC_IDLE UE behaviour based on the configuration for CORESET #0, initial Bandwidth Part (BWP) and Common Frequency Resources (CFR) for reception of broadcast services. CORESET #0 is where the UE can receive only the control resources CFR is where the UE can receive control and data broadcast.

In Rel-17, UEs receiving a broadcast service in RRC_IDLE/INACTIVE state can receive the relevant configuration using the following steps:

SIB20 includes details on how to receive MCCH (periodicity and offsets) within a given modification period, in addition to the details of CFR configuration. UE first reads the SIB20 to learn about such information.

Then, the UE reads MCCH which is transmitted in the CFR. Via reading MCCH, the UE can get to learn about which services are provided in the current cell, along with the necessary configuration how to receive those services.

Finally, the UE can receive the broadcast data.

Note that MCCH and data are to be transmitted in the same CFR.

Reduced capability (RedCap) devices have bandwidth (BW) limitations. This means that RedCap UEs cannot receive BWs larger than a specific maximum BW they support, e.g., 20 MHz. If the initial bandwidth part (BWP) of the system is larger than such limitations, RedCap UEs utilize an initial BWP separately configured by the system information block SIB1.

In Rel-17, 3GPP concluded that a RedCap UE can receive broadcast data, if the CFR BW is configured appropriately for a RedCap UE; in other words, if CFR BW is less than or equal to the RedCap UEs' supported BW. No specific MBS enhancements were made for those UEs.

In Rel-18, some companies proposed to introduce a new lower BW CFR for BW limited UEs like RedCap UEs.

However, none of the technical issues, including UE behaviour, were specified. Even if that operation is defined in Rel-18, it will be the baseline understanding, and enhancements are expected to be made in Rel-19. Companies are inclined towards a baseline solution that does not affect a normal (non-limited capacity or non-RedCap) UE.

In RAN2 #121, an agreement has been made on introducing a separate broadcast common-frequency resource (CFR) which can be used when the configured bandwidth for the default CFR in SIB20 exceeds the bandwidth capability of bandwidth limited or RedCap UEs. The proposal was made in R2-2300797.

If two separate CFRs are introduced, one CFR is used for the Redcap UEs and the other CFR is used for the normal UE. The new separate MBS CFR for RedCap UEs (separate from the legacy wideband MBS CFR for non-RedCap UEs) will be used for reception of MBS broadcast control and data.

The first option is that the legacy or wideband CFR (for non-bandwidth limited or non-RedCap UEs) and the narrowband CFR for RedCap UEs are separate or partially overlapping.

The wideband or non-RedCap CFR can be separate from the RedCap CFR, or possibly partially overlapping. In this case, "partially overlapping" means they may have some parts in common; for example, the CORESET #0, which is common and overlapping to both the wideband (non-RedCap) and the RedCap CFR. If the two CFRs are partially overlapping, it essentially implies that there will be two separate MCCH corresponding to the two CFR regions, as CORESET #0 contains only the control signaling resources. In that scenario, a normal (non-RedCap) UE would be reading the wideband CFR for broadcast control and data, whereas a RedCap UE would be reading the RedCap CFR. With this configuration, the following scenarios may arise:

The first option is that non-RedCap UE and the RedCap UE receive the common broadcast service in their respective CFRs. For a common broadcast service targeted at both the non-RedCap UE and the RedCap UE, two individual control and data streams are transmitted in the two different CFRs. The RedCap UE receives control and data in the RedCap CFR, whereas the non-RedCap UE receives control and data in the wideband non-RedCap CFR.

However, this option would necessitate transmission of the same data/control information twice over the air. As stated above, the baseline operation will be defined in Rel-18, and this first option is the likely outcome for that, as the aim is to not change normal UE (non-limited capacity/non-RedCap) behavior.

The second option is that both the non-RedCap UE and the RedCap UE receive some part of the common broadcast service only in the RedCap CFR. This could also manifest as a non-RedCap UE reading two MCCHs in a scenario where some part of the common broadcast service data is transmitted by the gNB only in the RedCap CFR region. Therefore, the non-RedCap UE would now have to read both the RedCap and non-RedCap MCCHs to determine the configurations to retrieve broadcast data in the RedCap CFR region. However, with this approach, the non-RedCap UE would always need to monitor two different MCCHs, leading to more power consumption at the UEs. It is important to note that unless the RedCap CFR is restricted for use only by the RedCap UEs, a Rel-18 non-RedCap and a Rel-18 RedCap UE should be able to read the RedCap CFR. However, Rel-17 UEs (be it a non-RedCap or a RedCap UE) will not be able to read the RedCap CFR introduced in Rel-18. This means that as soon as any Rel-17 UE joins the broadcast session, the broadcast data now has to be transmitted within the conventional Rel-17 CFR as described in the previous section.

From the options above it is clear that from the perspective of normal Rel-18 UEs, reading two MCCHs transmitted in Rel-18 normal CFR and Rel-18 RedCap CFR is not the most optimal strategy. The main objective of the embodiments described herein is to optimize Rel-18 normal UE's operation in presence of Rel-18 RedCap CFR.

Another scenario is that the legacy or wideband (non-limited capability or non-RedCap) CFR and RedCap or narrowband CFR overlaps). In this scenario, the two CFR regions are overlapping and therefore we can have a single MCCH transmitted in the common RedCap CFR and wideband CFR overlapped region. The gNB schedules to send the control signalling information within the overlapped CFR region which can be received both by the RedCap UE and normal UE. The drawback of this option is that the MCCH of the non-RedCap UE has to be transmitted within the smaller CFR region of the Redcap UEs. This could be detrimental for the non-RedCap UE, which might have an enhanced CFR requirement for MCCH. In this case, it is a challenge to determine how the gNB is to understand that the same Transmission Group Identifier (TMGI) for a broadcast service is meant for two different recipients. In this case, the two recipients are the non-RedCap UE and the RedCap UE.

Hence, broadcast operation when both the non-RedCap CFR and the RedCap CFR are configured is not optimal in terms of resource usage for scheduling the service or power consumption or efficient broadcast reception by non-RedCap UEs.

A solution has been agreed, which is to be enhanced in Rel-19. However, this solution is sub-optimal. In this agreed solution, a broadcast or multicast service(s) is treated in a way that it is transmitted in respective CFRs, i.e., in Rel-17 non-RedCap CFR and in Rel-18 RedCap CFR. For example, if a broadcast service is targeting both type of UEs, then it would be transmitted over the air twice. There are two problems with this solution.

The first problem is that the baseline solution in Rel-18 for broadcast or multicast reception by RedCap UEs is inefficient, as it requires transmission of the same service over the air once in each CFR, in case the service is targeting both normal and RedCap UEs. Furthermore, which service is to be provided in which CFR is left to the radio access node (gNB) implementation/configuration. It is not clear at all, how the gNB can efficiently and dynamically decide which CFR is to be used. Such dynamicity and efficiency are needed, as the gNB should be able to adapt to changes in, for example, cell load. It is required for the gNB to determine which CFR is to be used for data transmission. Once the gNB is aware that there are two different recipients for the same service, the gNB will have to choose between the proposed options above (transmitting the broadcast service in the non-RedCap CFR and in the non-RedCap CFR or transmitting the service only in the RedCap CFR to both the RedCap and the non-RedCap UEs). In addition to the drawbacks of these options described above, how the gNB chooses between the two options is not well-defined so far.

The second problem with the baseline solution in Rel-18 for broadcast reception by RedCap UEs is that choosing which CFR to utilize for a specific service is left to gNB implementation. It is not clear how gNB can efficiently and dynamically decide which CFR is to be used based on changing cell conditions and QoS requirements of the service.

Hence, means are currently missing for the gNB to address the issues above.

FIG. 1 schematically shows a system 100, according to an exemplary aspect, and in which the embodiments described herein may operate. The system 100 is part of a mobile communications network and comprises a mobile device 130-1, which may be a terminal device or user equipment (UE) or Internet of Things (IoT) device.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

For the purposes of this discussion, the part of the network depicted in FIG. 1 by the system 100 will be referred to as a 3GPP 5G network. However, this network could be any type of communication network, for example a 3G or 4G network, or it could be a 6G or other future network. Furthermore, the part of the 5G network shown by the system 100 could interact with another network of a different generation, for example a 4G or LTE network, or a 6G or other future network.

The system 100 further comprises a gNBs 120-1 and 120-2 with corresponding cells 130-1 and 130-2. The gNBs 120-1, 120-2 are part of a mobile communication network, which may include additional gNBs with corresponding cells.

Embodiments described herein may be implemented in any mobile communication network or radio system, such as one comprising at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources.

The embodiments are not, however, restricted to the systems/RATs given as an example but a person skilled in the art may apply the solution to other communication systems/networks provided with necessary properties. Some examples of a suitable communication networks include a 5G network and/or a 6G network. The 3GPP solution to 5G is referred to as New Radio (NR). 6G is envisaged to be a further development of 5G. NR has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G may require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

The signals of gNBs 120-1, 120-2 are observable by the mobile devices or user equipment (UE). The UEs 140-1, 140-2 are served by the gNB 120-1 within the cell 130-1. There may be other UEs served by the network shown in FIG. 1, which may be UE/IoT devices, e.g. a mobile phone or an autonomously driving vehicle.

gNBs 120-1 and 120-2 are connected to each other by an Xn interface, and are each connected to a core network 150 by a NG interface.

A plurality of different broadcast and/or multicast services (MBS) may be provided by gNB 120-1 in cell 130-1 over Multicast Traffic Channels (MTCH) which are the data channels where the multicast/broadcast services are provided.

gNB 120-1 provides information about the Multicast Traffic Channels (MTCHs) by, e.g. periodically, sending Multicast Control Channel (MCCH) messages which contain MTCH information (e.g. service configuration information) for the UEs within cell 130-1, such as UE 140-1, to receive the MTCH. The MTCH information may include control information necessary for the UE 140-1 to understand the multicast/broadcast services provided in the cell and scheduling information to receive the multicasted/broadcasted data.

The MCCH message is transmitted, e.g. periodically, by gNB 120-1 with a configured repetition period and within a configured transmission window.

gNB 120-1 provides information about the MCCH by sending SIB20 messages. SIB20 contains information (e.g. fallback configuration information) for mobile devices to receive the MCCH data, including the repetition period and configured transmission/reception window of MCCH.

The UE 140-1 may be in RRC_IDLE, RRC_INACTIVE or RRC_CONNECTED state.

If the UE 140-1 is in RRC_IDLE or RRC_INACTIVE state, in order to receive MBS, the UE 140-1 receives a SIB20 message, which is sent by the gNB 120-1. UE 140-1 then decodes the SIB20 message and therewith determines the MCCH configuration/scheduling details (e.g. service configuration set information). Then UE 140-1 receives the MCCH message sent by gNB 120-1 to learn about which MBSs are provided in the cell 140-1 and their scheduling information. The UE 140-1 is then able to receive the desired MBSs over the respective MTCHs.

Figure 2:
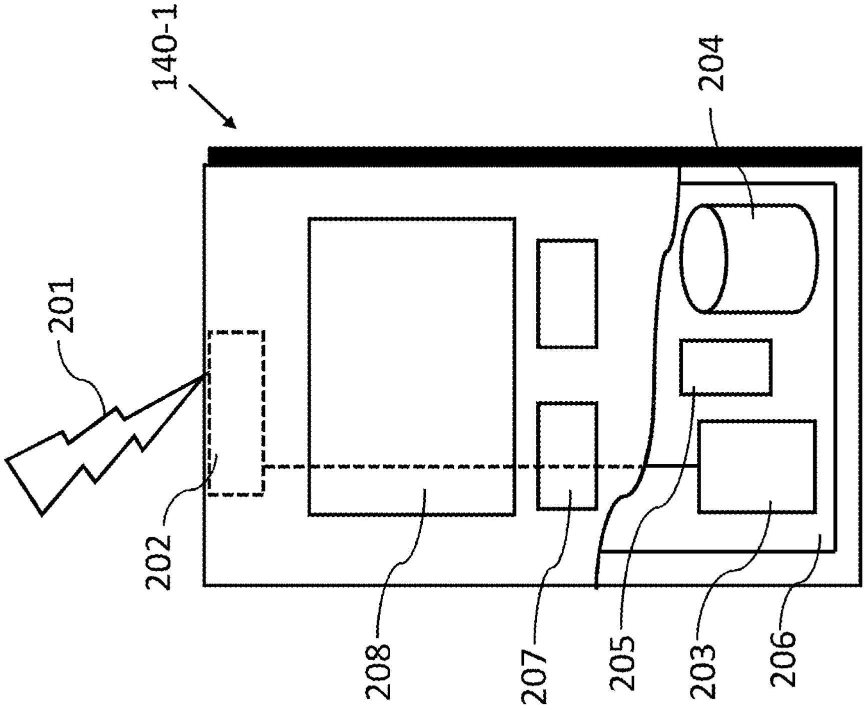
FIG. 2 shows a simplified schematic illustration of a user equipment suitable for performing embodiments of the invention.

An example of a UE 140-1, which may be any wireless communication device will now be described in more detail with reference to FIG. 2 showing a schematic, partially sectioned view of a communication device 140-1. An appropriate UE or mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The UE 140-1 may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

In this discussion UE 140-1 is a non-limited capability UE or non-RedCap UE, able to read a wideband or legacy CFR, whereas UE 140-2 is a limited capability UE or RedCap UE of the type described above, which can only read a RedCap CFR. The structure of the RedCap UE 140-2 is however, to all intents and purposes the same as the UE 140-1 shown in FIG. 2.

Throughout the document, non-RedCap UE, non-limited capability UE, normal UE and conventional UE refer to the same type of UE. Such a UE is expected to be a UE that is not a limited capability UE. Similarly, a RedCap UE and limited capability UE refer to the same type of UE.

The UE 140-1 may receive signals over an air or radio interface 201 via appropriate apparatus for receiving and may transmit signals via appropriate apparatus for transmitting radio signals. In FIG. 2, a transceiver apparatus is designated schematically by block 202. The transceiver apparatus 202 may be provided, for example, by means of a radio part and associated antenna arrangement. The antenna arrangement may be arranged internally or externally to the wireless device.

The UE 140-1 is typically provided with at least one data processing entity 203, at least one memory 204 and other possible components 205 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 206. The user may control the operation of the wireless device by means of a suitable user interface such as keypad 207, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto.

The components of the UE 140-1 shown in FIG. 2 and/or their associated circuitry may also be known as "means for receiving . . . ", "means for transmitting . . . ", "means for determining . . . ", etc.

Figure 3:
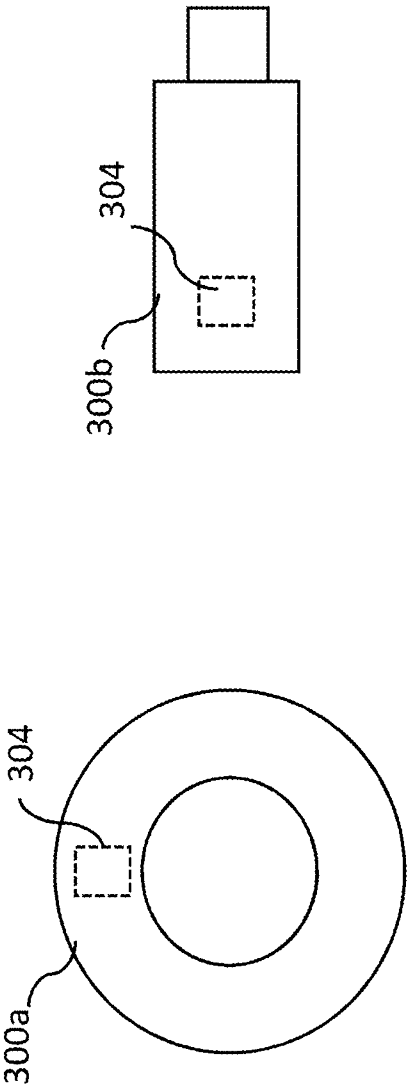
FIG. 3 schematically shows block diagrams of some examples of non-volatile storage media.
Figure 5:
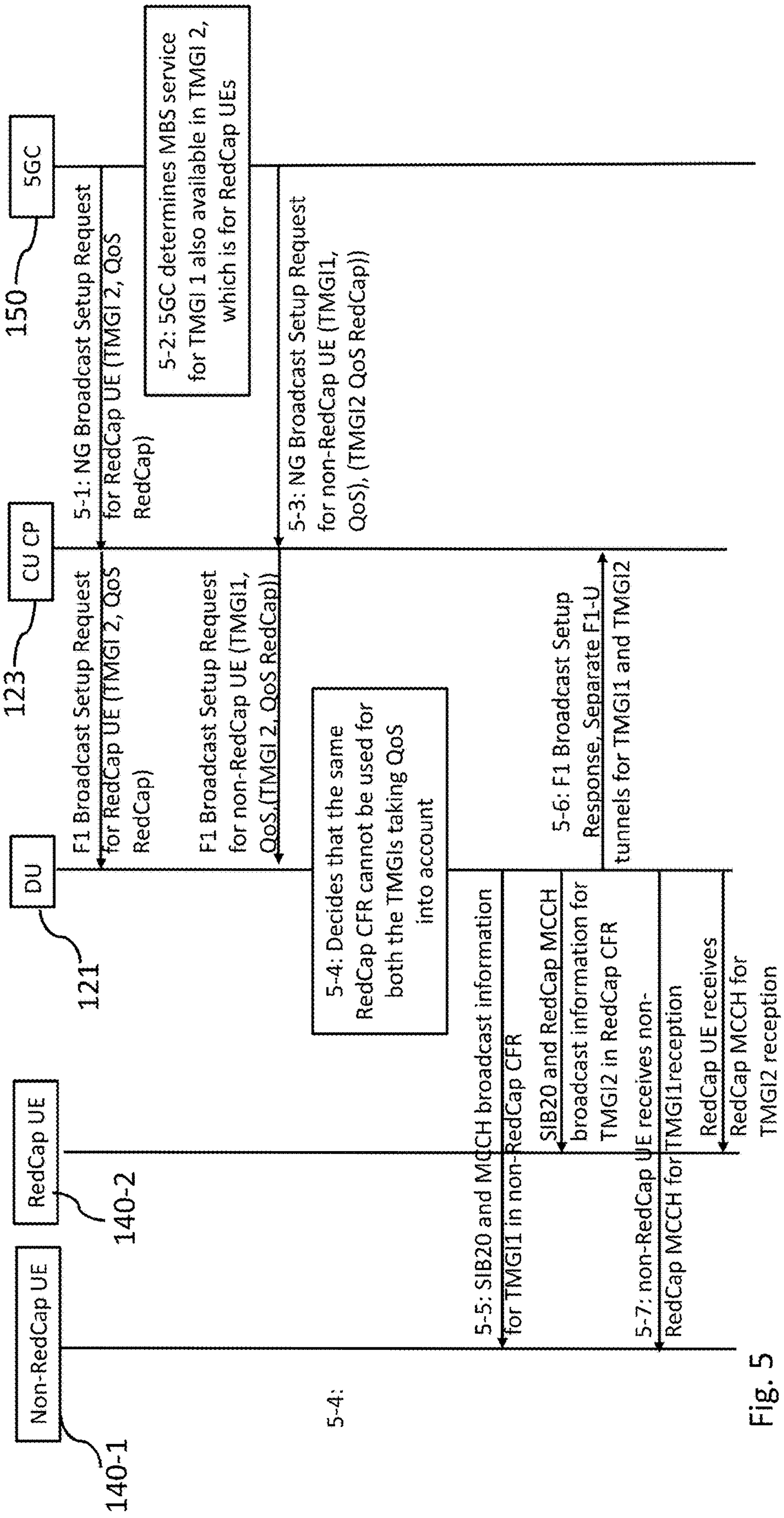
FIG. 5 shows a signal flow or message flow diagram according to an embodiment.
Figure 6:
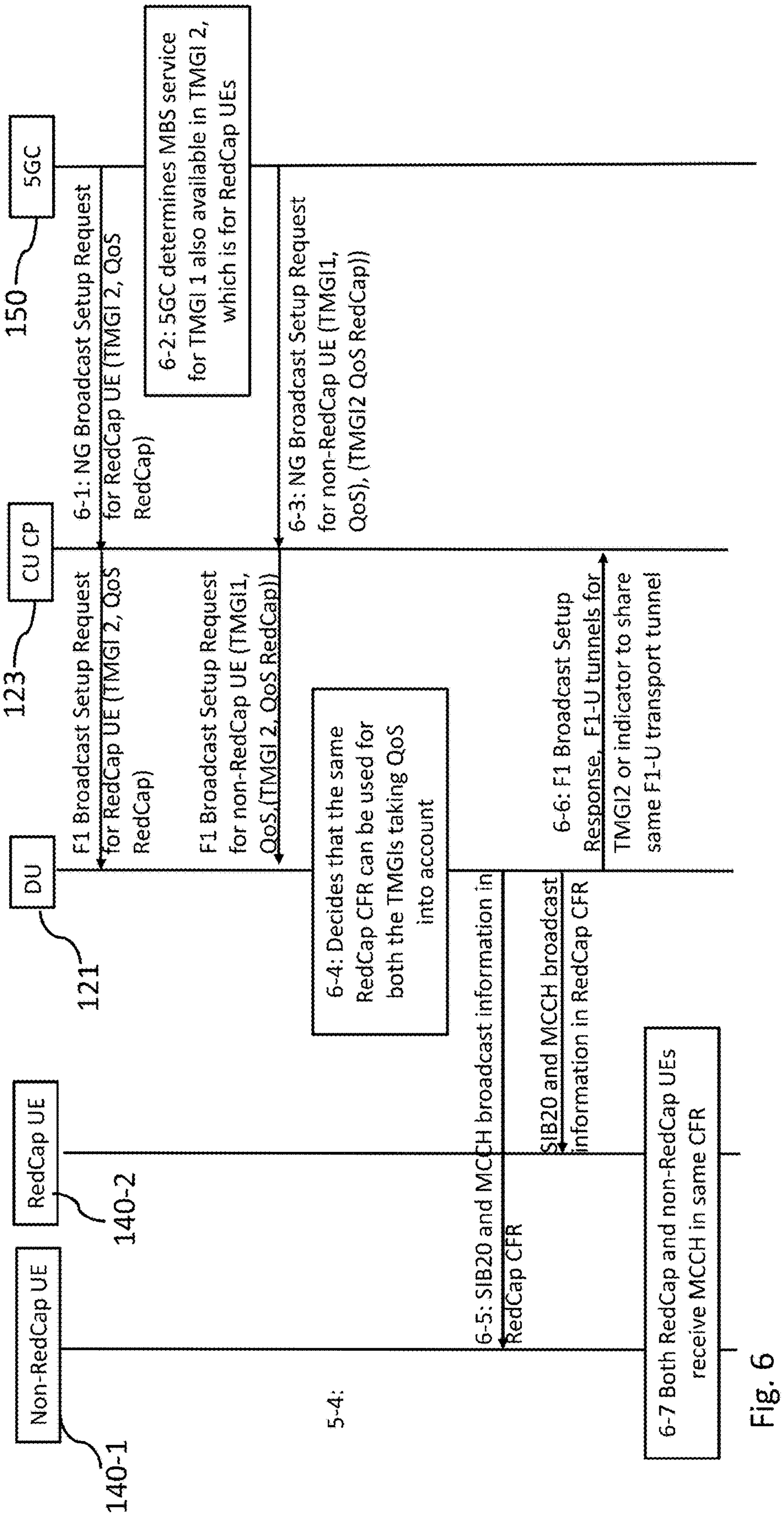
FIG. 6 shows a message flow diagram according to an embodiment.
Figure 7:
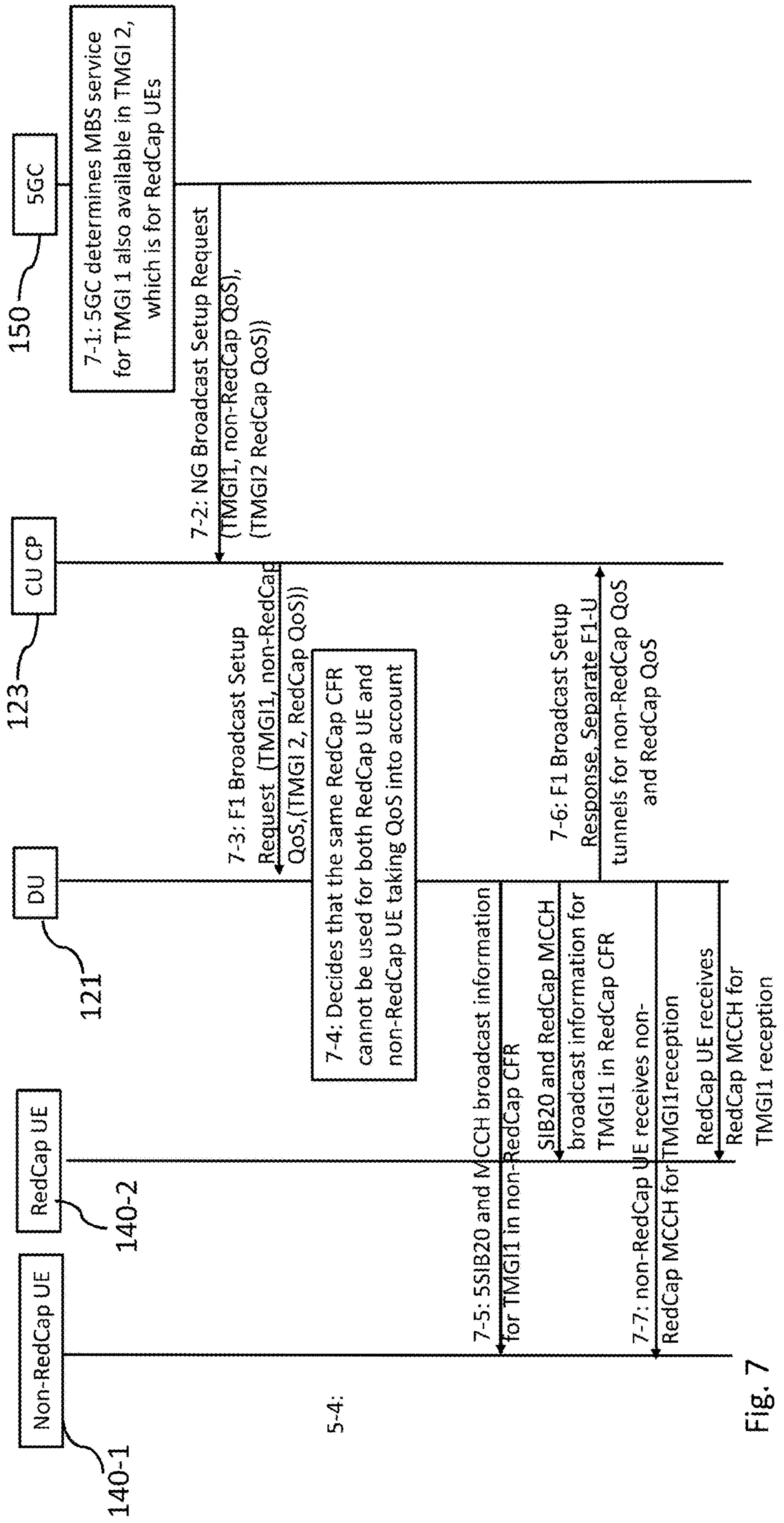
FIG. 7 shows a message flow diagram according to an embodiment.
Figure 8:
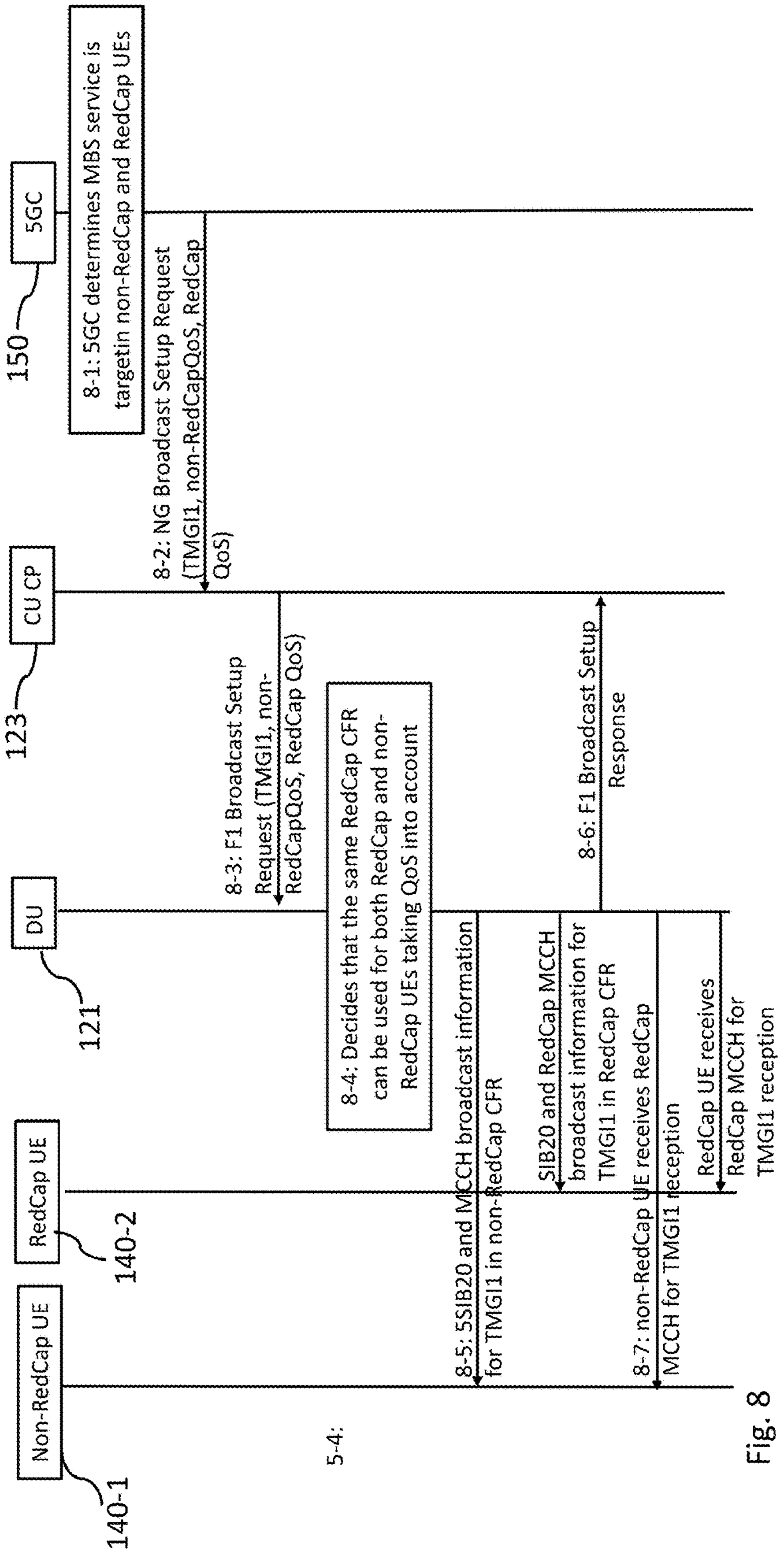
FIG. 8 shows a message flow diagram according to an embodiment.
Figure 9:
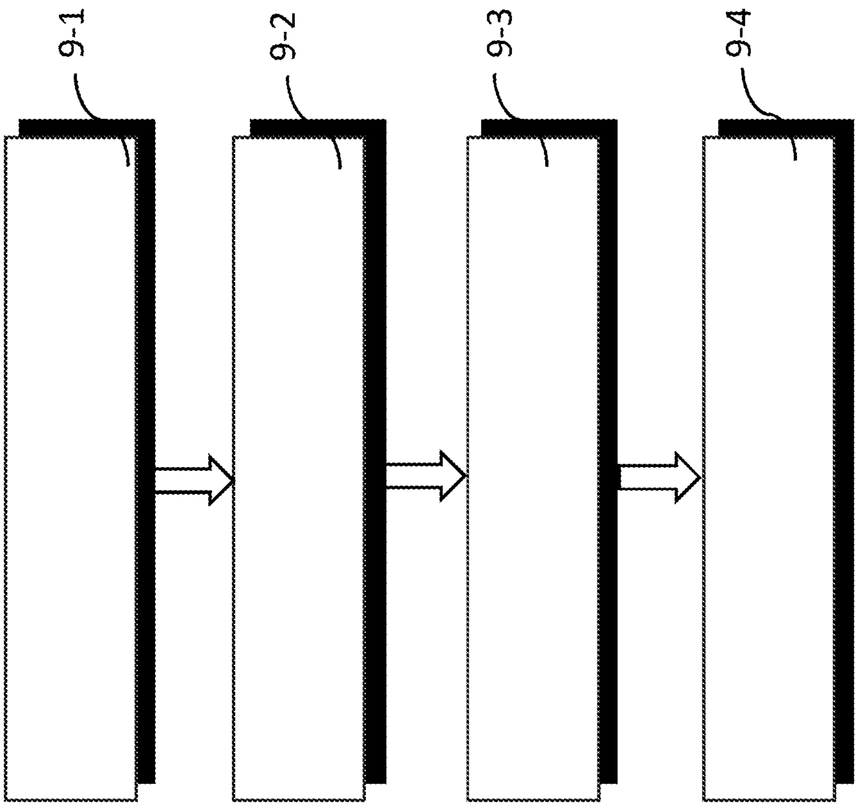
FIG. 9 shows a flow diagram illustrating a method according to an embodiment.
Figure 10:
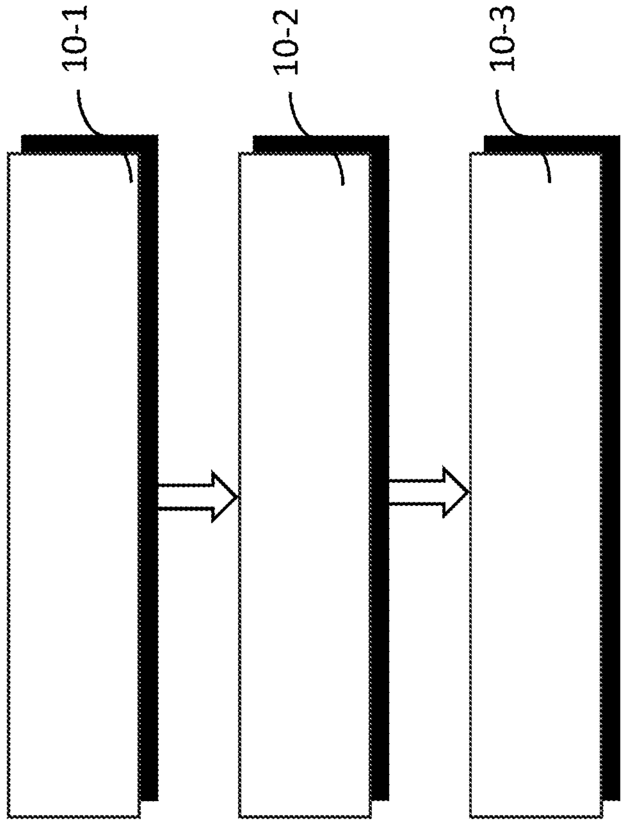
FIG. 10 shows a flow diagram illustrating a method according to an embodiment.

FIG. 3 shows a schematic representation of non-volatile memory media 300*a* (e.g. computer disc (CD) or digital versatile disc (DVD)) and 300*b* (e.g. universal serial bus (USB) memory stick) storing instructions and/or parameters 304 which when executed by a processor allow the processor to perform one or more of the steps of the methods of FIG. 5 and/or FIG. 6 and/or FIG. 7 and/or FIG. 8, and/or FIG. 9, and/or FIG. 10, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 5 and/or FIG. 6 and/or FIG. 7, and/or FIG. 8, and/or FIG. 9, and/or FIG. 10, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits, gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

a combination of analogue and/or digital hardware circuit(s) with software/firmware and i. (ii) any portions of hardware processor(s) with software (including digital signal processor(s)), software, and memory(ies) that work together to cause an apparatus, such as the communications device or base station to perform the various functions previously described; and (b) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 4:
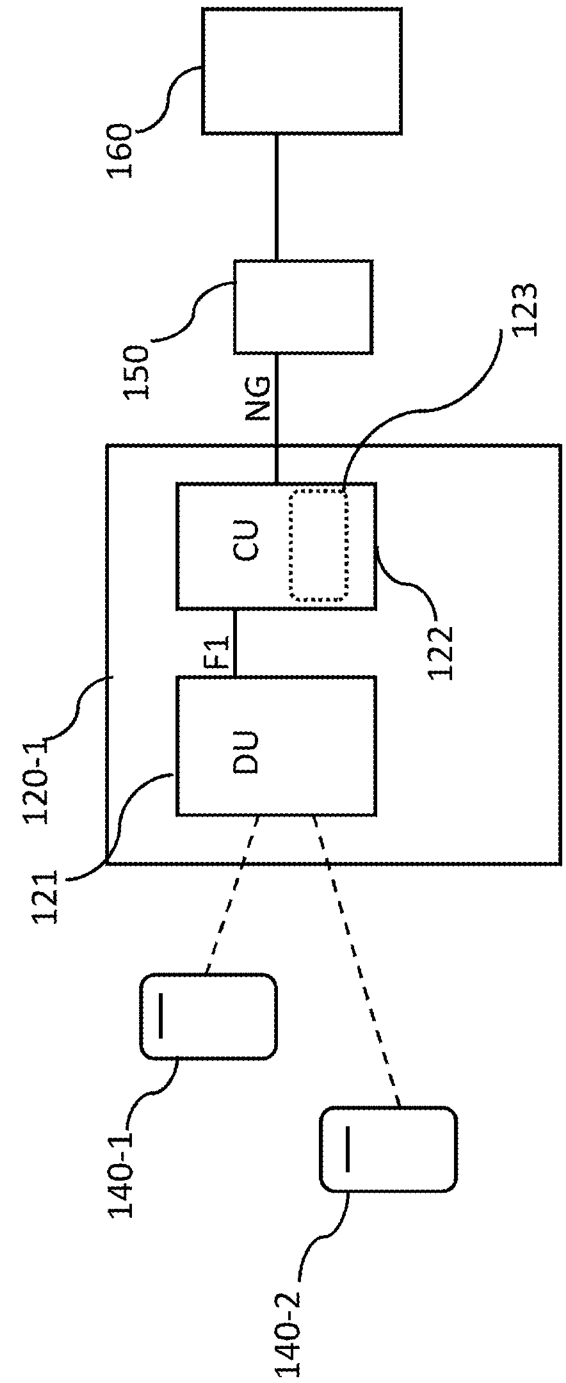
FIG. 4 shows a block diagram of a 5G network including a schematic illustration of a gNodeB suitable for performing embodiments of the invention.

FIG. 4 shows examples of simplified system architectures only showing some elements and functional entities, all being logical units, whose implementation may differ from what is shown. The connections shown in FIG. 4 are logical connections; the actual physical connections may be different. It is apparent to a person skilled in the art that the system typically comprises also other functions and structures than those shown in FIG. 4.

The examples are not, however, restricted to the system given as an example but a person skilled in the art may apply the solution to other communication systems provided with necessary properties.

The example of FIG. 4 shows a part of an exemplifying radio access network. For example, the radio access network may also support sidelink communications described below in more detail.

FIG. 4 shows UEs 140-1 and 140-2. The UEs 140-1, 140-2 are configured to be in a wireless connection on one or more communication channels with the gNB 120-1. The gNB 120-1 is further connected to a core network 150. For the purposes of this discussion, the node 120-1 is a gNB serving UEs 140-1, 140-2 in a cell. However, the node 120-1 may also be LTE eNB or even a non-3GPP access node. The physical link from a UE to a gNB is called uplink or reverse link and the physical link from the gNB to the UE is called downlink or forward link. It should be appreciated that gNBs or their functionalities may be implemented by using any node, host, server or access point etc. entity suitable for such a usage.

A communications system typically comprises more than one gNB, as shown in FIG. 1, in which case the gNBs may also be configured to communicate with one another over links, wired or wireless, designed for the purpose, for example a Xn interface. These links may be used for signalling purposes. The gNB 120-1 is a computing device configured to control the radio resources of communication system it is coupled to. The gNB 120-1 may also be referred to as a base station, an access point or any other type of interfacing device including a relay station capable of operating in a wireless environment. The gNB 120-1 includes or is coupled to transceivers. From the transceivers of the gNB, a connection is provided to an antenna unit that establishes bi-directional radio links to devices. The antenna unit may comprise a plurality of antennas or antenna elements. The gNB 120-1 is further connected to the 5G core network 150 (CN or next generation core NGC). Depending on the deployed technology, the gNB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices (UEs).

Examples of a UE device 140-1, 140-2 are a subscriber unit, a user device, a user equipment (UE), a user terminal, a terminal device, a mobile station, a mobile device, etc.

The UE device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The UEs 140-1, 140-2 illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 4) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system via the gNB 120-1 is also able to communicate with other networks 160, such as a public switched telephone network, or a VoIP network, or the Internet, or a private network, or utilize services provided by them. The communication network may also be able to support the usage of cloud services, for example at least part of core network operations may be carried out as a cloud service. This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 121 of the gNB 120-1) and centralized functions (also functions involving the core network 150) being carried out in a centralized manner (in a centralized unit CU 122 of the gNB 120-1). The DU 121 and CU are connected via the F1 interface. The CU 122 is connected to the 5G Core Network (5GC) 150 via the NG interface. The CU 122 may be split in to a user plane CU-UP and a control plane CU-CP. However, in some cases there is no such split in the CU 122. The centralized unit control plane CU CP 123 of the CU 122 provides control data for broadcast services. CU CP 123 is connected to 5GC 150 with the NG-C interface. It should also be understood that the distribution of labour between core network operations and base station operations may in future differ from that of the 5G standard or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

The system shown in FIG. 4 is only an example of a part of a radio access system and in practice, the system may comprise a plurality of gNBs, the UEs 140-1, 140-2 may have an access to a plurality of radio cells and the system may comprise also other apparatuses, such as physical layer relay nodes or other network elements, etc. At least one of the gNBs may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The gNB 120-1 of FIG. 4 may provide any kind of these cells. A cellular radio system may be implemented as a multilayer network including several kinds of cells.

The components of the gNB 120-1 shown in FIG. 4 and/or associated circuitry may also be known as "means for transmitting . . . ", "means for receiving . . . ", "means for determining . . . ", "means for providing . . . ", etc.

Targeting scenarios where the RedCap UEs and normal UEs are operating jointly, the embodiments described herein assist the source DU 121 to decide whether a at least one RedCap CFR can be used to receive broadcast/multicast sessions aimed at the normal UEs (for example UE 140-1) and for RedCap UEs (for example UE 140-2) or whether it would require two separate CFRs, i.e., one per each type of UEs. To facilitate this, there are signalling enhancements over the NG and F1 interfaces. The signaling enhancements are explained in the following embodiments.

In one embodiment, there are two broadcast session setup requests coming from the core network (5G Core (5GC)) 150 to the gNB 120-1, i.e., one for each type of UEs (normal UE 140-1 and Redcap UE 140-2). 5GC 150 may create two TMGIs (session identifiers) TGMI 1 and TGMI 2, and send different QoS criteria for the two types of UEs 140-1, 140-2.

On the NG interface, the 5GC 150 sends over NGAP to the control plane (CP) of the central-unit (CU-CP) 123 of the gNB 120-1 an indication whether the TMGI 2 is for an MBS broadcast session for RedCap UEs, together with the QoS associated to the session. In addition, 5GC 150 sends to the gNB 120-1 (specifically to the CU 122 of the gNB 120-1) a link to a normal (non-RedCap) TMGI 1 for the same broadcast session with which it is associated, indicating that the normal TMGI 1 is also available already for the same broadcast service, but for a different UE type. The 5GC 150 may also send for a normal MBS broadcast session TMGI 1, a link to a RedCap MBS broadcast session TMGI 2 with which it is associated, indicating that the TMGI 1 is also available in the MBS service session for the RedCap UEs.

If the CU 122 is split into CU UP and CU CP, the gNB-CU CP 123 receives from the gNB-DU 121 two different F1-U transport addresses, or an indication from the DU 121 that the RedCap CFR cannot be used for both TMGI1 (for normal UEs) and TMGI2 (for Redcap UEs), the gNB 120-1 sends back two different NG-U transport addresses to the 5GC 150 to enable two different deliveries over NG-U. If the CU 122 is not split, the gNB 102-1 will send these to the 5GC 150.

If the CU CP 123 receives from the DU 121 only one F1-U tunnel endpoint or an indication from the DU 121 that the RedCap CFR can be used for both TMGI1 (for non-RedCap UEs) and TMGI2 (for RedCap UEs), the gNB 120-1 sends back only one NG-U tunnel endpoint to the 5GC 150 to enable only one delivery over NG-U.

Another embodiment relates to aspects of the F1 interface. The CU CP 123 sends an F1AP Broadcast Setup Request to the DU 121 including an indication as to whether the TMGI 2 is for an MBS broadcast session for RedCap UEs, together with the QoS (MRB QoS and/or QoS Flows QoS) associated to the session of TMGI 2. The CU CP 123 may also send for a non-RedCap MBS broadcast session TMGI 1 a link to a redcap MBS broadcast session TMGI 2 with which it is associated, together with the QoS (MRB QoS and/or QoS Flows QoS) associated to the session of the RedCap TMGI.

If the DU 121 decides, taking into account the received QoS parameters, that RedCap CFR cannot be used for both TMGI1 (for normal UEs) and TMGI2 (for RedCap UEs) it sends back two different F1-U transport addresses to the CU CP 123 to enable two different deliveries over F1-U.

If instead the DU 121 decides, taking into account the received QoS parameters, that the RedCap CFR can be used for both TMGI1 (for normal UEs) and TMGI2 (for RedCap UEs) it sends back either the F1-U transport address already used for TMGI1 and/or a new indicator pointing to the sharing of the F1-U transport address used by TMGI 1.

In a further implementation of this embodiment, there is only one broadcast session setup request sent from the core network (5G Core (5GC) 150) to the gNB 120-1 for both non-RedCap and Redcap UEs. In this broadcast session setup request message, the 5GC 150 may send two different sets of QoS parameters, corresponding respectively to delivery to non-RedCap UE 140-1 and delivery to RedCap UE 140-2.

In a further embodiment, relating to aspects of the NG interface, the 5GC 150 sends through the CU CP 123 of the gNB 120-1 two sets of QoS requirements for a same TMGI in a MBS broadcast session request. One set of QoS requirements is to be sent for non-RedCap UEs, for example UE 140-1, and a new QoS requirement is to be sent for the RedCap UEs, for example UE 140-2. If the CU CP 123 receives from the DU 121 two different F1-U transport addresses and/or an indication from the DU 121 that the redcap CFR cannot be used to match the requirement of both sets of QoS parameters, the gNB 120-1 sends back two different NG-U transport addresses to the 5GC 150 to enable two different deliveries over NG-U. If the CU CP 123 receives from the DU 121 only one F1-U transport address, and optionally an indication from the DU 121 that the redcap CFR can be used to match both sets of QoS parameters, the gNB 120-1 sends back only one NG-U transport address to the 5GC 150 to enable only one delivery over NG-U.

Another embodiment relates to aspects of the F1 interface. The CU CP 123 sends, in an F1AP Broadcast Setup Request to the DU 121, two sets of QoS parameters (MRB QoS and/or QoS Flows QoS) associated to the session of the same TMGI.

If the DU 121 decides, taking into account the received QoS parameters, that the RedCap CFR cannot be used to match the requirement of both sets of received QoS parameters (for non-RedCap UEs and for Redcap UEs) it sends back two different F1-U transport addresses to the CU CP 123 to enable two different deliveries over F1-U.

If instead the DU 121 decides, taking into account the received QoS parameters, that the RedCap CFR can be used to match both sets of received QoS parameters (for non-RedCap UEs and Redcap UEs) it sends back one F1-U transport address and optionally a new indicator pointing to the sharing of the F1-U transport address.

A further embodiment relates to aspects of the gNB-DU. In this embodiment the DU 121 of the gNB 120-1 decides if the same common CFR can be used for the RedCap UEs, for example UE 140-2 and the non-RedCap UEs, for example UE 140-1, based on quality of service (QOS) requirement for the RedCap UEs and the quality of service (QOS) requirement of non-RedCap UEs.

The various embodiments will now be described with reference to the signal flow diagrams shown in FIGS. 5 to 8.

FIG. 5 shows an embodiment carried out by Steps 5-1-5-7.

Step 5-1: The 5GC 150 sends an NG Broadcast Setup Request including TMGI 2 and associated QoS parameters, and may also include a RedCap indication indicating that the broadcast session corresponds to RedCap UEs. Similarly, the CU CP 123 sends an F1AP Broadcast Setup Request including TMGI 2, associated QoS parameters, and may also include a RedCap indication indicating that the broadcast session corresponds to RedCap UEs.

Step 5-2: The 5GC 150 sends an NG Broadcast setup request message including TMGI 1 and associated QoS parameters (MBS QoS parameters for MBS QoS flow) for non-RedCap UEs, and also includes an indication that the same service is available for RedCap UEs with a link to TMGI 2 and/or a RedCap indicator.

Step 5-3: Similarly, the CU CP 123 sends an F1AP Broadcast setup request message including TMGI 1, associated QoS parameters (MRB QoS and QoS flow QoS), and also includes an indication that the same service is available for RedCap UEs with a link to TMGI 2 and/or a RedCap indicator.

Step 5-4: The DU 121, taking into account the received Qos parameters, decides that the RedCap CFR cannot be used for both TMGI1 and TMGI2.

Step 5-5: The DU 121 generates SIB20 and MCCH for TMGI 1 in normal CFR (non-redcap CFR) destined to non-RedCap UEs, along with SIB20 and RedCap MCCH for TMGI 2 in RedCap CFR destined to RedCap UEs.

Step 5-6: The DU 121 sends back an F1AP Broadcast setup response for TMGI 1 with a F1-U transport address different from the F1-U transport address for TMGI 2 for separate delivery.

Step 5-7: RedCap UE 140-2 receives the MCCH in the RedCap CFR and non-RedCap UE 140-1 receives MCCH in non-redcap CFR.

FIG. 6 shows an embodiment carried out in steps 6-1-6-7 of the signal flow diagram.

Step 6-1: The 5GC 150 sends NG broadcast setup request including TMGI 2, associated QoS parameters, and may include a RedCap indication indicating that the broadcast session corresponds to RedCap UEs. Similarly, the CU CP 123 sends an F1AP Broadcast setup request including TMGI 1, associated QoS parameters, and may include a RedCap indication indicating that the broadcast session corresponds to RedCap UEs.

Step 6-2: The 5GC 150 sends an NG broadcast setup request message including TMGI 1, associated QoS parameters (MBS QoS parameters for MBS QoS flows) for normal UEs and includes an indication that the same service is available for Redcap UEs with a link to TMGI 2 and/or a RedCap indicator.

Step 6-3: The CU CP 123 sends an F1AP Broadcast setup request message including TMGI 1, associated QoS parameters (MRB QoS and flow Qos), and newly includes an indication that the same service is available for RedCap UEs with a link to TMGI 2 and/or a RedCap indicator.

Step 6-4: The DU 121, taking into account the received QoS parameters, decides that redcap CFR can be used for both TMGI1 and TMGI2.

Step 6-5: The DU 121 generates a MCCH and/or SIBx common for TMGI2 and TMGI1 in the RedCap CFR destined to both RedCap UE 140-2 and non-RedCap UE 140-1.

Step 6-6: The DU 121 sends back an F1AP Broadcast setup response for TMGI2 to the CU CP 123 newly including either the F1-U transport address already used for TMGI1 and/or a new indicator pointing to the sharing of the F1-U address used by TMGI 1.

Step 6-7: Both the RedCap UE 140-2 and the non-RedCap UE 140-1 receive a common MCCH from the DU 121 for TMGI 1 and TMGI 2 in RedCap CFR for broadcast data reception.

FIG. 7 shows an embodiment carried out by steps 7-1 to 7-7 of the signal flow diagram.

Step 7-1: The 5GC 150 determines that there exists a single MBS session (single TMGI) that targets both the non-RedCap UE 140-1 and the RedCap UE 140-2.

Step 7-2: The 5GC 150 sends a NG Broadcast setup request for the single TMGI denoted as TMGI-1. However, this single TMGI-1 contains two sets of associated QoS parameters, one set for the normal UEs (e.g., UE 140-1) marked as Normal QoS and the other set for the alternative/RedCap UEs (e.g. UE 140-2) marked as RedCap/Alternative QoS.

Step 7-3: Similarly, the CU CP 123 sends an F1AP Broadcast setup request message including TMGI 1, associated QoS parameters and QoS flow for the two set of QoS (Non-RedCap QoS and RedCap QoS), Step 7-4: The DU 121, taking into account the received QoS parameters from CU-CP 123, decides that the RedCap CFR cannot be used for both the normal and RedCap UEs considering their QoS requirement.

Step 7-5: For the same common TMGI-1, DU 121 generates SIB20 and MCCH for non-RedCap UEs in a non-RedCap CFR along with SIB20 and RedCap MCCH for the RedCap UEs in RedCap CFR.

Step 7-6: The DU 121 sends back an F1AP Broadcast setup response for the common TMGI 1 with two separate F1-U tunnels using two different F1-U addresses aimed at the normal and RedCap CFR for separate delivery.

Step 7-7: The RedCap UE 140-2 receives the MCCH in the RedCap CFR and non-RedCap UE 140-1 receives the MCCH in non-RedCap CFR.

FIG. 8 shows an embodiment carried out by steps 8-1-8-7 of the signal flow diagram.

Step 8-1: 5GC 150*s* determines that there exists a single MBS service session (single TMGI) that targets both non-RedCap UEs 140-1 and RedCap UEs 140-2.

Step 8-2: 5GC 150 sends NG Broadcast setup request for the single TMGI denoted as TMGI-1. However, this single TMGI-1 contains two sets of associated QoS parameters, one set for the non-RedCap (normal) UEs 140-1 marked as Normal QoS and the other set for the alternative/RedCap UEs 140-2 marked as RedCap/Alternative QoS.

Step 8-3: Similarly CU CP 123 sends an F1AP Broadcast setup request message including TMGI 1, associated QoS parameters and QoS flow for the two set of QoS (non-RedCap QoS and RedCap QoS).

Step 8-4: The DU 121, taking into account the received QoS parameters from CU CP 123 decides that the RedCap CFR can be used for both the non-RedCap UEs 140-1 and RedCap UEs 140-2, considering their QoS requirement.

Step 8-5: For the same common TMGI-1, the DU 121 generates SIB20 and normal MCCH along with SIB20 and RedCap MCCH, both in the RedCap CFR, for the normal UEs 140-1 and RedCap UEs 140-2, respectively.

Step 8-6: The DU 121 sends back an F1AP Broadcast setup response for the common TMGI.

Step 8-7: Redcap UEs 140-2 receive the MCCH in the RedCap CFR, while non RedCap UEs 140-1 also receive the normal MCCH in the RedCap CFR.

FIG. 9 shows a flow diagram depicting method according to an embodiment. The method can be performed by the gNB 120-1, or similar apparatus, or a component of the gNB 120-1. For simplicity, the method will be described here as performed by the gNB 120-1.

In step 9-1, the gNB 120-1 receives a first QoS information for the limited capability (RedCap) UE 140-2 and a second QoS information for the non-limited capability (non-RedCap) UE 140-1. The first and second QoS information both relate to a MBS broadcast or multicast session available on both the RedCap UE 140-2 and the non-RedCap UE 140-1.

The gNB 120-1 can receive a broadcast session setup request from the core network 150, which contains broadcast session details, which is the TMGI and its corresponding QoS information. TMGI includes the MBMS service ID, mobile country code and mobile network code.

Other information, in addition to the as QoS information, may be received by the gNB 120-1 from the core network 150.

In step 9-2, the gNB 120-1 determines, based on the received first and second QoS information, whether a CFR associated with the RedCap UE 140-2 can be used for receiving the MBS broadcast or multicast session by both the RedCap UE 140-2 and the non-RedCap UE 140-1;

In step 9-3, the gNB 120-1 provides a first tunnel for the transmission of the MBS broadcast or multicast session to the RedCap UE 140-2 and a second tunnel for transmission of the MBS broadcast or multicast session to the non-RedCap UE 140-1 if it is determined that the common frequency resource associated with the RedCap UE 140-2 cannot be used for receiving the MBS broadcast or multicast session by both the RedCap UE 140-2 and the non-RedCap UE 140-1.

In step 9-4, if the gNB 120-1 has determined that the CFR associated with the RedCap UE 140-2 can be used for receiving the MBS broadcast or multicast session by both the RedCap UE 140-2 and the non-RedCap UE 140-1, the gNB provides just one transmission tunnel for the transmission of the MBS broadcast or multicast session to the RedCap UE 140-2 and for the transmission of the MBS broadcast or multicast session to the non-RedCap UE 140-1.

FIG. 10 shows a flow diagram representing a method according to an embodiment, which can be performed by the CU 122 of the gNB 120-1 or similar apparatus, or the CU CP 123 of the gNB 120-1. For simplicity, the method will be described as being performed by the CU CP 123.

In step 10-1, the CU CP 123 receives a first QoS information for the RedCap UE 140-2 and a second QoS information for the non-RedCap UE 140-1 from the 5GC 150. The first and second QoS information relate to an MBS broadcast or multicast session available for both the limited capability UE 140-2 and the non-limited capability UE 140-1;

In step 10-2, the CU CP 123 determines, based on the received first and second QoS information, whether the CFR associated with the limited capability UE 140-2 can be used for receiving the MBS broadcast or multicast session by both the limited capability UE 140-2 and the non-limited capability UE 140-1.

In step 10-3, the CU CP 123 provides back to the 5G Core 150 at least one of:

- a single tunnel transport layer address (TNLA) for the transmission of the MBS broadcast or multicast session to both the limited capability UE 140-2 and non-limited capability UE 140-1 if it is determined that the common frequency resource associated with the limited capability UE 140-2 can be used for receiving the MBS broadcast or multicast session by both the limited capability UE 140-2 and the non-limited capability UE 140-1,
- separate tunnel TNLAs if it is determined that the CFR associated with the limited capability UE 140-2 cannot be used for receiving the MBS broadcast or multicast session by both the limited capability 140-2 UE and the non-limited capability UE 140-1,
- an indicator indicating that the CFR associated with the limited capability UE 140-2 can be used for receiving the MBS broadcast or multicast session by both the limited capability UE 140-2 and the non-limited capability UE 140-1 if it is determined that the CFR associated with the limited capability UE 140-2 can be used for receiving the MBS broadcast or multicast session by both the limited capability UE 140-2 and the non-limited capability UE 140-1, and/or an indicator indicating that the common frequency resource associated with the limited capability UE 140-2 cannot be used for receiving the MBS broadcast or multicast session by both the limited capability UE 140-2 and the non-limited capability UE 140-1, if it is determined by the CU CP 123 that the common frequency resource associated with the limited capability UE 140-2 cannot be used for receiving the MBS broadcast or multicast session by both the limited capability UE 140-2 and the non-limited capability UE 140-1.

Figure 11:
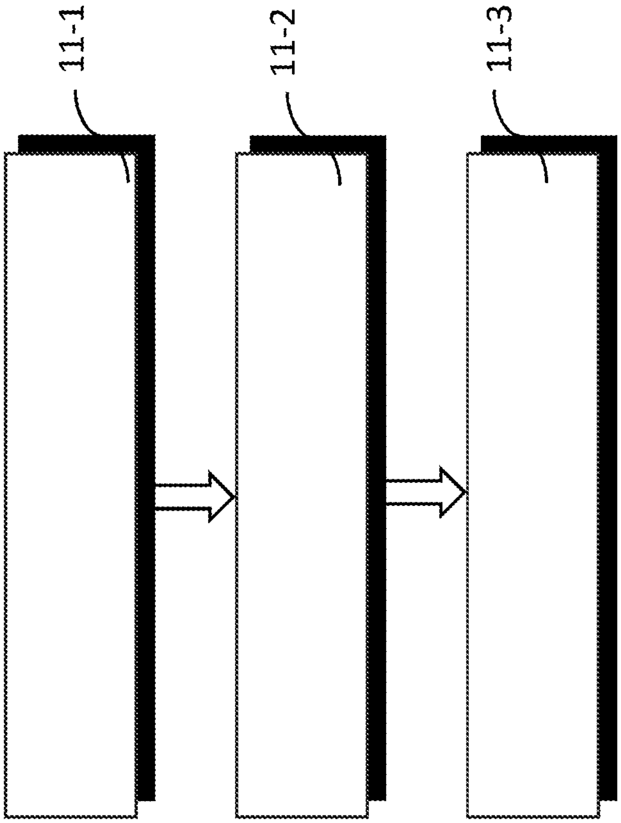
FIG. 11 shows a flow diagram illustrating a method according to an embodiment.

FIG. 11 shows a flow diagram representing a method according to an embodiment, which can be performed by the DU 121 of the gNB 120-1 or similar apparatus. For simplicity, the method will be described as being performed by the DU 121.

In step 11-1, the DU 121 of the gNB 120-1 receives from the central unit control plane, CU CP 123, of the gNB 120-1, a first QoS information for the limited capability UE 140-2 and a second QoS information for the non-limited capability UE 140-1. The first and second QoS information relate to an MBS broadcast or multicast session available for both the limited capability UE 140-2 and the non-limited capability UE 140-1.

In step 11-2, based on the received first and second QoS information, the DU 121 determines whether a CFR associated with the limited capability UE 140-2 can be used for receiving the MBS broadcast or multicast session by both the limited capability UE 140-2 and the non-limited capability UE 140-1.

In step 11-3, the DU 121 provides back to the CU CP at least one of:

a single tunnel transport layer address (TNLA) for the transmission of the MBS broadcast or multicast session to both the limited capability UE 140-2 and non-limited capability UE 140-1 if the DU 121 determines that the CFR associated with the limited capability UE 140-2 can be used for receiving the MBS broadcast or multicast session by both the limited capability UE 140-2 and the non-limited capability UE 140-1, separate tunnel TNLAs if the DU 121 determines that the CFR associated with the limited capability UE 140-2 cannot be used for receiving the MBS broadcast or multicast session by both the limited capability UE 140-2 and the non-limited capability UE 140-1, an indicator indicating that the CFR associated with the limited capability UE 140-2 can be used for receiving the MBS broadcast or multicast session by both the limited capability UE 140-2 and the non-limited capability UE 140-1 if the DU 121 determines that CFR associated with the limited capability UE 140-2 can be used for receiving the MBS broadcast or multicast session by both the limited capability UE 140-2 and the non-limited capability UE 140-1, and/or an indicator indicating that the CFR associated with the limited capability UE 140-2 cannot be used for receiving the MBS broadcast or multicast session by both the limited capability UE 140-2 and the non-limited capability UE 140-1 if the DU 121 determines that the CFR associated with the limited capability UE 140-2 cannot be used for receiving the MBS broadcast or multicast session by both the limited capability UE 140-2 and the non-limited capability UE 140-1.

After the network at the gNB 120-1 receives the first MBS session broadcast request for the RedCap UE 140-2, along with the corresponding TMGI and QoS details, it is the core network 150 that determines that same MBS service is also targeted for non-RedCap UE 140-1.

The core network 150 sends another broadcast session set up request this time for non-RedCap UE 140-1, which has its own TMGI and QoS details, along with the link for TMGI and associated QoS of the RedCap UEs.

When the network or gNB 120-1 checks the broadcast session set up request of the non-RedCap UEs 140-1, which contains this link for the TMGI and QoS for the RedCap UE 140-2, only then it checks if the same common frequency resource can be used both for RedCap and non-RedCap UEs or not. It is not by default that the gNB 120-1 will check for this since it is receiving two different TMGI set up requests.

The 5G Core Network Function is configured with the information that a particular broadcast service is targeting both RedCap and non-RedCap UEs and provides the QoS information based on such a configuration.

Although the invention has been described hereinabove with reference to specific embodiments, it is not limited to these embodiments, and no doubt further alternatives will occur to the skilled person, which lie within the scope of the invention as claimed.

The features of each of the embodiments may also be combined with features from other embodiments, and are not limited to those described herein.

The invention claimed is:

1. An apparatus comprising:

at least one processor; and at least one memory including computer program code, wherein the at least one memory and the computer program code are configured, with the at least one processor, to cause the apparatus to:

receive, from a 5G Core Network Function, a first quality of service (QoS) information for a first limited capability user equipment (UE) and a second QoS information for a first non-limited capability UE, wherein the first and second QoS information relate to a broadcast and/or multicast service (MBS) available for both the first limited capability UE and the first non-limited capability UE;

determine, based on the received first and second QoS information, whether a common frequency resource associated with the first limited capability UE can be used for receiving the MBS by both the first limited capability UE and the first non-limited capability UE; and based on determining that the common frequency resource associated with the first limited capability UE can be used for receiving the MBS by both the first limited capability UE and the first non-limited capability UE:

provide back to the 5G Core Network Function a single tunnel transport layer address (TNLA) for a transmission of the MBS to both the first limited capability UE and the first non-limited capability UE; and provide back to the 5G Core Network Function an indicator indicating that the common frequency resource associated with the first limited capability UE can be used for receiving the MBS by both the first limited capability UE and the first non-limited capability;

receive, from the 5G Core Network Function, a third QoS information for a second limited capability UE and a fourth QoS information for a second non-limited capability UE, wherein the third and fourth QoS information relate to the MBS that is available for both the second limited capability UE and the second non-limited capability UE;

determine, based on the received third and fourth QoS information, whether a common frequency resource associated with the second limited capability UE can be used for receiving the MBS by both the second limited capability UE and the second non-limited capability UE; and based on determining that the common frequency resource associated with the second limited capability UE cannot be used for receiving the MBS by both the second limited capability UE and the second non-limited capability UE:

provide back to the 5G Core Network Function separate tunnel TNLAs; and provide back to the 5G Core Network Function an indicator indicating that the common frequency resource associated with the second limited capability UE cannot be used for receiving the MBS by both the second limited capability UE and the second non-limited capability UE.

2. The apparatus of claim 1, wherein the first QoS information and the second QoS information received from the 5G core network function are associated with a same MBS identifier or TMGI (temporary mobile group identifier).

3. The apparatus of claim 2, wherein the first and second QoS information are received from the 5G core (5GC) in a next generation (NG) application protocol broadcast or multicast setup request or modification request message.

4. The apparatus of claim 3, wherein the first QoS information is received from the 5GC associated with a first MBS identifier or TMGI 1 and the second QoS information is received from the 5GC associated with a second MBS identifier or TMGI 2.

5. The apparatus of claim 4, wherein the first QoS information is received in a first NG application protocol broadcast or multicast setup or modification request message including the first MBS identifier TMGI 1 and the second QoS information is received in a second NG application protocol broadcast or multicast setup or modification request message including the second MBS identifier TMGI 2.

6. The apparatus of claim 5, wherein the determining is performed based further on a received indication from the 5GC, the indication indicating that both the first MBS identifier or the TMGI 1 and the second MBS identifier or the TMGI 2 relate to the same MBS.

7. The apparatus of claim 6, wherein the apparatus is comprised within a radio access node.

8. The apparatus of claim 7, wherein the apparatus is comprised in a central unit control plane (CU CP) entity of the radio access node.

9. The apparatus of claim 7, wherein the determining comprises:

sending to a distributed unit (DU) of the radio access node a third QoS information for a second limited capability UE and a fourth QoS information for a second non-limited capability UE, wherein the third and fourth QoS information relate to a second MBS available for both the second limited capability UE and the second non-limited capability UE, and receiving from the DU:

a single DU tunnel TNLA based on determining that the common frequency resource associated with the second limited capability UE can be used for receiving the second MBS by both the second limited capability UE and the second non-limited capability UE, a separate DU tunnel TNLA based on determining that the common frequency resource associated with the second limited capability UE cannot be used for receiving the second MBS by both the second limited capability UE and the second non-limited capability UE, an indicator indicating that the common frequency resource associated with the second limited capability UE can be used for receiving the second MBS by both the second limited capability UE and the second non-limited capability UE based on determining that the common frequency resource associated with the second limited capability UE can be used for receiving the second MBS by both the second limited capability UE and the second non-limited capability UE, and an indicator indicating that the common frequency resource associated with the second limited capability UE cannot be used for receiving the second MBS by both the second limited capability UE and the second non-limited capability UE based on determining that the common frequency resource associated with the second limited capability UE cannot be used for receiving the second MBS by both the second limited capability UE and the second non-limited capability UE.

10. A system comprising:

an apparatus:

at least one processor; and at least one memory including computer program code, wherein the at least one memory and the computer program code are configured, with the at least one processor, to cause the apparatus to:

receive, from a 5G Core Network Function, a first quality of service (QoS) information for a first limited capability user equipment (UE) and a second QoS information for a first non-limited capability UE, wherein the first and second QoS information relate to a broadcast and/or multicast service (MBS) available for both the first limited capability UE and the first non-limited capability UE;

determine, based on the received first and second QoS information, whether a common frequency resource associated with the first limited capability UE can be used for receiving the MBS by both the first limited capability UE and the first non-limited capability UE; and based on determining that the common frequency resource associated with the first limited capability UE can be used for receiving the MBS by both the first limited capability UE and the first non-limited capability UE:

provide back to the 5G Core Network Function a single tunnel transport layer address (TNLA) for a transmission of the MBS to both the first limited capability UE and the first non-limited capability UE; and provide back to the 5G Core Network Function an indicator indicating that the common frequency resource associated with the first limited capability UE can be used for receiving the MBS by both the first limited capability UE and the first non-limited capability;

receive, from the 5G Core Network Function, a third QoS information for a second limited capability UE and a fourth QoS information for a second non-limited capability UE, wherein the third and fourth QoS information relate to the MBS that is available for both the second limited capability UE and the second non-limited capability UE;

determine, based on the received third and fourth QoS information, whether a common frequency resource associated with the second limited capability UE can be used for receiving the MBS by both the second limited capability UE and the second non-limited capability UE; and based on determining that the common frequency resource associated with the second limited capability UE cannot be used for receiving the MBS by both the second limited capability UE and the second non-limited capability UE:

provide back to the 5G Core Network Function separate tunnel TNLAs; and provide back to the 5G Core Network Function an indicator indicating that the common frequency resource associated with the second limited capability UE cannot be used for receiving the MBS by both the second limited capability UE and the second non-limited capability UE.

11. The system of claim 10, wherein the first QoS information and the second QoS information received from the 5G core network function are associated with a same MBS identifier or TMGI (temporary mobile group identifier).

12. The system of claim 11, wherein the first and second QoS information are received from the 5G core (5GC) in a next generation (NG) application protocol broadcast or multicast setup request or modification request message.

13. The system of claim 12, wherein the first QoS information is received from the 5GC associated with a first MBS identifier or TMGI 1 and the second QoS information is received from the 5GC associated with a second MBS identifier or TMGI 2.

14. The system of claim 13, wherein the first QoS information is received in a first NG application protocol broadcast or multicast setup or modification request message including the first MBS identifier TMGI 1 and the second QoS information is received in a second NG application protocol broadcast or multicast setup or modification request message including the second MBS identifier TMGI 2.

15. The system of claim 14, wherein the determining is performed based further on a received indication from the 5GC, the indication indicating that both the first MBS identifier or the TMGI 1 and the second MBS identifier or the TMGI 2 relate to the same MBS.

16. The system of claim 15, wherein the apparatus is comprised within a radio access node.

17. The system of claim 16, wherein the apparatus is comprised in a central unit control plane (CU CP) entity of the radio access node.

18. The system of claim 16, wherein the determining comprises:

sending to a distributed unit (DU) of the radio access node a third QoS information for a second limited capability UE and a fourth QoS information for a second non-limited capability UE, wherein the third and fourth QoS information relate to a second MBS available for both the second limited capability UE and the second non-limited capability UE, and receiving from the DU:

a single DU tunnel TNLA based on determining that the common frequency resource associated with the second limited capability UE can be used for receiving the second MBS by both the second limited capability UE and the second non-limited capability UE, a separate DU tunnel TNLA based on determining that the common frequency resource associated with the second limited capability UE cannot be used for receiving the second MBS by both the second limited capability UE and the second non-limited capability UE, an indicator indicating that the common frequency resource associated with the second limited capability UE can be used for receiving the second MBS by both the second limited capability UE and the second non-limited capability UE based on determining that the common frequency resource associated with the second limited capability UE can be used for receiving the second MBS by both the second limited capability UE and the second non-limited capability UE, and an indicator indicating that the common frequency resource associated with the second limited capability UE cannot be used for receiving the second MBS by both the second limited capability UE and the second non-limited capability UE based on determining that the common frequency resource associated with the second limited capability UE cannot be used for receiving the second MBS by both the second limited capability UE and the second non-limited capability UE.

19. A method comprising:

receiving, by an apparatus from a 5G Core Network Function, a first quality of service (QoS) information for a first limited capability user equipment (UE) and a second QoS information for a first non-limited capability UE, wherein the first and second QoS information relate to a broadcast and/or multicast service (MBS) available for both the first limited capability UE and the first non-limited capability UE;

determining, based on the received first and second QoS information, whether a common frequency resource associated with the first limited capability UE can be used for receiving the MBS by both the first limited capability UE and the first non-limited capability UE; and based on determining that the common frequency resource associated with the first limited capability UE can be used for receiving the MBS by both the first limited capability UE and the first non-limited capability UE:

providing back to the 5G Core Network Function a single tunnel transport layer address (TNLA) for a transmission of the MBS to both the first limited capability UE and the first non-limited capability UE; and providing back to the 5G Core Network Function an indicator indicating that the common frequency resource associated with the first limited capability UE can be used for receiving the MBS by both the first limited capability UE and the first non-limited capability;

receiving, from the 5G Core Network Function, a third QoS information for a second limited capability UE and a fourth QoS information for a second non-limited capability UE, wherein the third and fourth QoS information relate to the MBS that is available for both the second limited capability UE and the second non-limited capability UE;

determining, based on the received third and fourth QoS information, whether a common frequency resource associated with the second limited capability UE can be used for receiving the MBS by both the second limited capability UE and the second non-limited capability UE; and based on determining that the common frequency resource associated with the second limited capability UE cannot be used for receiving the MBS by both the second limited capability UE and the second non-limited capability UE:

providing back to the 5G Core Network Function separate tunnel TNLAs; and providing back to the 5G Core Network Function an indicator indicating that the common frequency resource associated with the second limited capability UE cannot be used for receiving the MBS by both the second limited capability UE and the second non-limited capability UE.

20. The method of claim 19, wherein the apparatus is comprised within a radio access node, and wherein the determining comprises:

sending to a distributed unit (DU) of the radio access node a third QoS information for a second limited capability UE and a fourth QoS information for a second non-limited capability UE, wherein the third and fourth QoS information relate to a second MBS available for both the second limited capability UE and the second non-limited capability UE, and receiving from the DU:

a single DU tunnel TNLA based on determining that the common frequency resource associated with the second limited capability UE can be used for receiving the second MBS by both the second limited capability UE and the second non-limited capability UE, a separate DU tunnel TNLA based on determining that the common frequency resource associated with the second limited capability UE cannot be used for receiving the second MBS by both the second limited capability UE and the second non-limited capability UE, an indicator indicating that the common frequency resource associated with the second limited capability UE can be used for receiving the second MBS by both the second limited capability UE and the second non-limited capability UE based on determining that the common frequency resource associated with the second limited capability UE can be used for receiving the second MBS by both the second limited capability UE and the second non-limited capability UE, and an indicator indicating that the common frequency resource associated with the second limited capability UE cannot be used for receiving the second MBS by both the second limited capability UE and the second non-limited capability UE based on determining that the common frequency resource associated with the second limited capability UE cannot be used for receiving the second MBS by both the second limited capability UE and the second non-limited capability UE.

* * * * *